United States Patent [19]

Kotzin

[11] Patent Number: 4,522,277
[45] Date of Patent: Jun. 11, 1985

[54] ROCKING SCALE

[76] Inventor: Bernard Kotzin, 510 Anderson St., Manhattan Beach, Calif. 90266

[21] Appl. No.: 487,723

[22] Filed: Apr. 22, 1983

[51] Int. Cl.³ .......................... G01G 1/36; G01G 21/22
[52] U.S. Cl. ...................................... 177/250; 177/262
[58] Field of Search ................ 177/216, 246, 250, 262

[56] References Cited

U.S. PATENT DOCUMENTS

| | | | |
|---|---|---|---|
| 2,368,984 | 2/1945 | Hart | 177/250 |
| 2,949,287 | 8/1960 | Linsley | 177/246 |
| 3,334,698 | 8/1967 | Von Ronn | 177/250 X |
| 3,786,885 | 1/1974 | Mills | 177/250 X |
| 4,384,629 | 5/1983 | Kotzin | 177/224 |

Primary Examiner—George H. Miller, Jr.
Attorney, Agent, or Firm—Edward D. O'Brian; K. H. Boswell

[57] ABSTRACT

A rocking scale or weighing device can be constructed so as to include a body equipped with two separate, spaced, identical bowed supports or rockers which extend generally between the ends of the body. A holder capable of holding an envelope or the like perpendicular to the body is located at one of the ends of the body. Guides are provided on the body for use in holding a counterbalance member so that it may be moved towards and away from the holder. Indicia are provided for indicating the weight of an object held by the holder by the position of the counterbalance member on the body. Detents may be provided for use in temporarily securing the counterbalance member in a specific position.

6 Claims, 6 Drawing Figures

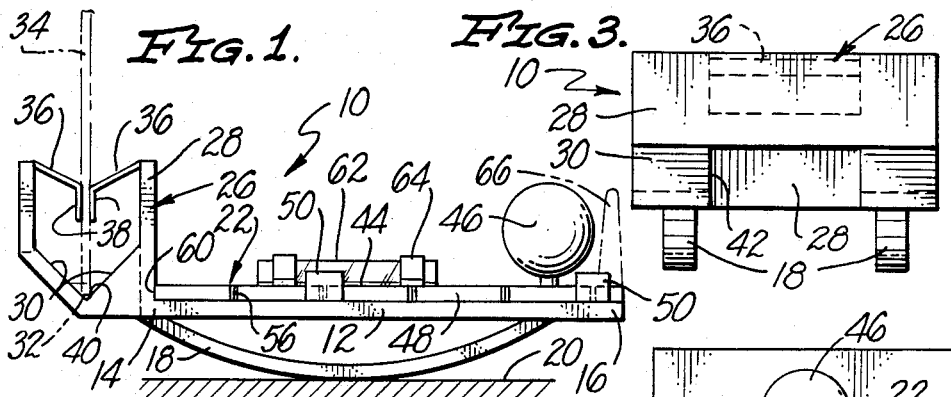

ROCKING SCALE

CROSS-REFERENCE TO RELATED APPLICATIONS

This application contains subject matter set forth in the co-pending U.S.A. application by the inventor named herein, Bernard Kotzin, Ser. No. 257,927 filed Apr. 21, 1981 entitled "Weighing Device". The entire disclosure of this co-pending application is incorporated herein by reference. This co-pending application issued on May 24, 1983 as U.S. Pat. No. 4,384,629.

SUMMARY OF THE INVENTION

The invention set forth in this specification pertains to new and improved rocking scales which are primarily useful in weighing envelopes and the like in determining the postage needed to send such objects through the mail.

It will be apparent from the preceding that the present invention relates to structures as are commonly referred to as weighing devices. More specifically, it relates to structures which are constructed so as to utilize a rocking type of action in weighing a letter, postcard or the like. A number of different types of so-called rocking scales or weighing devices have been proposed. The extent to which such prior devices have been used is not known. It is, however, known that such prior devices are not commonly utilized.

The reasons why prior rocking scales are not commonly utilized are not fully known or understood. It is considered that probably these devices have not found wide acceptance as a result of one or more of a series of different factors. It is known that some of these prior devices are moderately complex and that this tends to make these devices more expensive than desirable if these devices are to be widely sold for home use in weighing envelopes and the like. In is considered possible that the relative complexity of some of these devices may have tended to detract from their accuracy for weighing purposes. It is also considered possible that the manners in which many of these prior devices are constructed have tended to make these prior devices relatively inconvenient to use and/or have tended to detract from the accuracy of these devices.

BRIEF SUMMARY OF THE INVENTION

It is believed that it will be apparent from the preceding that there is a need for new and improved rocking scales. A broad objective of the present invention is to fulfill this need. More specifically, the present invention is intended to provide new and improved rocking scales; which can be easily and conveniently manufactured at a comparatively nominal cost; which are easily and conveniently used, which are sufficiently accurate for use in weighing various items to be mailed through the mail so as to insure that the proper postage is applied to such items; and which are capable of giving prolonged reliable service with no or substantially no maintenance.

In accordance with this invention these various objectives are achieved by providing a weighing device including a body having opposed ends, support means located on said body for supporting said body in a horizontal position on a surface in such a manner that said body can tilt so that either of said ends is higher than the other and holding means for holding an object to be weighed located adjacent to one of said ends of said body in which the improvement comprises: a counterbalance member located on said body, guide means on said body holding said counterbalance member so that it can be moved towards and away from said holding means, indicia means for indicating weight of an object held by said holder by the position of said counterbalance member on said body, the position of said end of said body upon which holding means is located relative to the position of the other end of said body indicating whether the weight of an object held by said holder is more or less than a specific value indicated by said indicia means, said indicia means serving to indicate the weight of an object held in said holder when the position of said body relative to said surface is horizontal.

BRIEF DESCRIPTION OF THE DRAWING

Because of the nature of this invention, it is best more fully described with reference to the accompanying drawing in which:

FIG. 1 is a side elevational view of a presently preferred embodiment of a rocking scale in accordance with this invention in which a portion of an object is shown in phantom in the position in which the object will be held during a weighing operation;

FIG. 2 is a top plan view thereof;

FIG. 3 is an end elevational view showing the left end thereof;

FIG. 4 is an end elevational view showing the right end therof;

FIG. 5 is a bottom plan view thereof; and

FIG. 6 is a top plan view thereof corresponding to FIG. 2 showing the counterbalance member in the scale in a position such as it could occupy during a weighing operation.

The particular rocking scale or weighing device illustrated in the drawing utilizes various operative concepts or principles of the invention as set forth in the appended claims. It is believed that it will be obvious to those who are qualified in the design and construction of weighing devices that these same concepts or principles can be embodied within a wide variety of somewhat differently appearing and different-ly constructed devices. For this reason, this invention is not to be considered as being limited to a rocking scale precisely conforming to the rocking scale illustrated.

DETAILED DESCRIPTION

In the drawing there is shown a weighing device or rocking scale 10 in accordance with this invention which includes a flat planar body 12 having ends 14 and 16. This body 12 is integral with two separate, spaced, identical, bowed, parallel supports or rockers 18. These supports 18 extend generally between the two ends 14 and 16 and are intended to support the entire scale 10 on an appropriate flat, horizontal surface 20 as the scale 10 is used. This entire scale 10 is dimensioned so that weight is distributed throughout it in such a manner that when a counterbalance member 22 is in a position as shown in FIGS. 1 and 2, the body 12 will extend horizontally as the supports 18 engage the surface 20. Slots 24 may be provided in the body 12 so as to facilitate molding of the supports 18.

At the end 14 there is provided a generally upstanding holder 26 including generally vertically extending walls 28. These walls 28 are joined by generally v-shaped walls 30 which are adapted to support the lower edge 32 of an card, envelope or other like object 34 being weighed with the use of the scale 10. Such an object 34 will normally be held so that it extends vertically at a right angle to the body 12 through the use of spring arms 36 carried by the walls 28. These spring arms 36 extend generally downwardly from the walls 28 and terminate in vertically extending ends 38. These ends 38 are preferably spaced apart a short distance roughly corresponding to the thickness of a postcard. Such spacing minimizes the "work" required in inserting an object to be weighed between these arms 36. These ends 38 are located as shown in FIG. 1 so that the object 34 is directly above the bottom edges 40 of the walls 30. An opening 42 is preferably provided directly beneath the arms 36 so as to facilitate the manufacture of the scale 10.

The counterbalance member 22 includes an elongated flat bottom plate 44 which directly overlies a part of the body 12. It also includes an upstanding handle 46. This handle 46 serves as a handle and, in addition, serves as a weight or mass. The side edges 48 of the plate 44 are parallel to one another and are held or restrained by upstanding holding arms 50. These arms 50 overlie the plate 44 as shown. In order to facilitate the manufacture of the scale 10, openings 52 may be located in the body 12 adjacent to the arms 50.

If desired, small ribs 54 may be located on the arms 50 in positions in which they can co-act with notches 56 formed in the edges 48 so as to serve as co-acting detent members. When these ribs 54 and the notches 56 are used, either the holding arms 50 or the body 12 or both should be formed of a somewhat deformable resilient material so that a detent type action will be achieved which will enable the counterbalance member 42 to be releasably held in any of a series of different positions.

In order to complete the scale 10, various different indicia 58 are provided on the body 12 adjacent to an end 60 of the plate 44 closest adjacent to the holder 26. These indicia 58 correspond to various units of weight. The indicia 58 can be located in other positions such as, for example, along the edges 48 on the body 12.

When the scale 10 is to be used, it is located on a surface 20 as shown either before or after an object 34 has been located in the holder 26 as indicated in FIG. 1. Next, with the object 34 in place, the counter-balance member 22 is moved through the use of the handle 46 generally away from the holder 26 until such time as it has been moved adequately so that the scale 10 balances in the sense that the body 12 is horizontal. Normally, this position of the scale 12 may be determined visually with sufficient accuracy with use of the scale 10 in weighing letters and the like.

If increased accuracy is desired, a small spirit level tube 62 may be mounted directly on the plate 44 as shown through the use of holding arms 64 formed integrally with the plate 44 or may be mounted directly upon the body 12 in a similar manner. This level 62 will, of course, indicate when the desired adjustment of a counterbalance member 22 has been achieved.

At this point, the relative position of the end 60 with respect to the indicia 58 will indicate the weight of the object 34. If desired, the scale 10 can be utilized without being balanced so as to indicate if the weight of an object 34 is more or less than a specific value such as a weight requiring a specific amount of postage needed to mail a letter by merely setting the member 22 to indicate a specific weight and seeing which of the two ends 14 or 16 is above the other when an object 34 is in place.

It is believed that it is apparent from the preceding that the scale 10 is a comparatively simple but effective structure for its intended purpose. All of this scale 10 can be conveniently manufactured as an integral unit by known injection molding techniques using a polymer such as high impact styrene which is comparatively inexpensive and somewhat resilient in character. The counterbalance member 22 utilizes a separate handle 46 as shown primarily for aesthetic reasons. If desired, an integrally molded upstanding lug type handle 66 as indicated in phantom in FIGS. 1 and 2 can be substituted for the handle 46 shown.

I claim:

1. A weighing device including a body having opposed ends, support means located on said body for supporting said body in a horizontal position on a surface in such a manner that said body can tilt so that either of said ends is higher than the other and holding means for holding an object to be weighed located adjacent to one of said ends of said body in which the improvement comprises:

a counterbalance member located on said body, guide means on said body holding said counterbalance member so that it can be moved towards and away from said holding means, indicia means for indicating weight of an object held by said holder by the position of said counterbalance member on said body, the position of said end of said body upon which holding means is located relative to the position of the other end of said body indicating the weight of an object held by said holder more or less than a specific value indicated by said indicia means, said indicia means serving to indicate the weight of an object held in said holder when the position of said body relative to said surface is horizontal, said holding means is only capable of holding an envelope vertically at a specific distance along the horizontal line of the location where said support means engages said surface when the position of said body is horizontal.

2. A weighing device as claimed in claim 1 wherein: said support means comprise rocker means enabling said weighing device to tilt as a result of a rocking action.

3. A weighing device including a body having opposed ends, support means located on said body for supporting said body in a horizontal position on a surface in such a manner that said body can tilt so that either of said ends is higher than the other and holding means for holding an object to be weighed located adjacent to one of said ends of said body in which the improvement comprises:

a counterbalance member located on said body, guide means on said body holding said counterbalance member so that it can be moved towards and away from said holding means, indicia means for indicating weight of an object held by said holder by the position of said counterbalance member on said body, the position of said end of said body upon which holding means is located relative to the position of the other end of said body indicating the weight of an object held by said holder more or less than a specific value indicated by said indicia means, said indicia means serving to indicate the weight of an object held in said holder when the position of said body relative to said surface is horizontal, said support means comprising rocker means enabling said weighing device to tilt as a result of a rocking action, said rocker means comprises two separate, spaced, identical, bowed rockers attached to said body so as to extend downwardly therefrom.

4. A weighing device including a body having opposed ends, support means located on said body for supporting said body in a horizontal position on a surface in such a manner that said body can tilt so that either of said ends is higher than the other and holding means for holding an object to be weighed located adjacent to one of said ends of said body in which the improvement comprises:

a counterbalance member located on said body, guide means on said body holding said counterbalance member so that it can be moved towards and away from said holding means, indicia means for indicating weight of an object held by said holder by the position of said counterbalance member on said body, the position of said end of said body upon which holding means is located relative to the position of the other end of said body indicating the weight of an object held by said holder more or less than a specific value indicated by said indicia means, said indicia means serving to indicate the weight of an object held in said holder when the position of said body relative to said surface is horizontal, said holding means is capable of holding an envelope vertically when the position of said body is horizontal, said holding means comprises generally V-shaped walls and spring arms, said spring arms being capable of holding an envelope or similar member so that it rests on the bottom edges of said walls and so that it extends upwardly through said spring means.

5. A weighing device including a body having opposed ends, support means located on said body for supporting said body in a horizontal position on a surface in such a manner that said body can tilt so that either of said ends is higher than the other and holding means for holding an object to be weighed located adjacent to one of said ends of said body in which the improvement comprises:

a counterbalance member located on said body, guide means on said body holding said counterbalance member so that it can be moved towards and away from said holding means, indicia means for indicating weight of an object held by said holder by the position of said counterbalance member on said body, the position of said end of said body upon which holding means is located relative to the position of the other end of said body indicating the weight of an object held by said holder more or less than specific value indicated by said indicia means, said indicia means serving to indicate the weight of an object held in said holder when the position of said body relative to said surface is horizontal, said support means comprise rocker means enabling said weighing device to tilt as a result of a rocking action, said rocker means comprises two separate, spaced, identical, bowed rockers attached to said body so as to extend downwardly therefrom, said holding means is capable of holding an envelope vertically when the position of said body is horizontal, said holding means comprises generally V-shaped walls and spring arms, said spring arms being capable of holding an envelope or similar member so that it rests on the bottom edges of said walls and so that it extends upwardly through said spring means.

6. A weighing device as claimed in claim 5 including:

level means for indicating when said body is horizontally located on said body, said level means is a spirit level and is held on said body by being supported by said counterbalance member, detent means for holding said counterbalance member against movement as said body tilts, said detent means permitting adjustment of the position of said counterbalance member relative to said body.

* * * * *